US011402658B2

(12) United States Patent
Chang

(10) Patent No.: US 11,402,658 B2
(45) Date of Patent: Aug. 2, 2022

(54) REMOVABLE, ADJUSTABLE WIRE ARMS FOR NOSE PADS

(71) Applicant: General Scientific Corp., Ann Arbor, MI (US)

(72) Inventor: Byung J. Chang, Ann Arbor, MI (US)

(73) Assignee: General Scientific Corp. / Surgitel, Ann Arbor, MI (US)

( * ) Notice: Subject to any disclaimer, the term of this patent is extended or adjusted under 35 U.S.C. 154(b) by 0 days.

(21) Appl. No.: 16/526,001

(22) Filed: Jul. 30, 2019

(65) Prior Publication Data

US 2021/0033883 A1    Feb. 4, 2021

(51) Int. Cl.
  *G02C 5/12*        (2006.01)
  *G02C 7/08*        (2006.01)
(52) U.S. Cl.
  CPC ............. *G02C 5/124* (2013.01); *G02C 7/086* (2013.01); *G02C 2200/10* (2013.01)
(58) Field of Classification Search
  CPC .... G02C 5/124; G02C 7/086; G02C 2200/10; G02C 7/088
  USPC ........................................... 351/41, 136, 137
  See application file for complete search history.

(56) References Cited

U.S. PATENT DOCUMENTS

| 3,476,468 | A | * | 11/1969 | Fortenberry | ........... | G02C 5/126 |
| | | | | | | 351/130 |
| 4,113,365 | A | * | 9/1978 | Koketsu | ................. | G02C 5/124 |
| | | | | | | 351/128 |
| D329,446 | S | * | 9/1992 | Negishi | ......................... | 351/106 |
| 6,520,636 | B2 | * | 2/2003 | Saitoh | .................... | G02C 5/126 |
| | | | | | | 351/137 |
| 6,799,847 | B2 | * | 10/2004 | Caplan | ................... | G02C 7/088 |
| | | | | | | 351/128 |

\* cited by examiner

*Primary Examiner* — Tuyen Tra
(74) *Attorney, Agent, or Firm* — Law Offices John G. Posa

(57) ABSTRACT

An assembly with removable and replaceable wire arms is used to attach different nose pad configurations to eyeglass frames for enhanced versatility. A plate with front and back surfaces and opposing side edges mounts on the bridge portion of the eyeglass frames. Opposing right and left wire members extending downwardly from the side edges of the plate terminate in a coupling mechanism adapted to receive a nose pad. The wire members are manually bendable, enabling a user to independently adjust the distance between the nose pads and the distance of the nose pads from the eyeglass frames. The coupling mechanisms may include holes to receive nose pads with posts, and screws to hold the posts in position, or barbed fins to receive nose pads with slots that engage with the barbed fins. The coupling mechanisms may receive physically separate nose pads or nose pads interconnected through an upper nose rest.

9 Claims, 11 Drawing Sheets

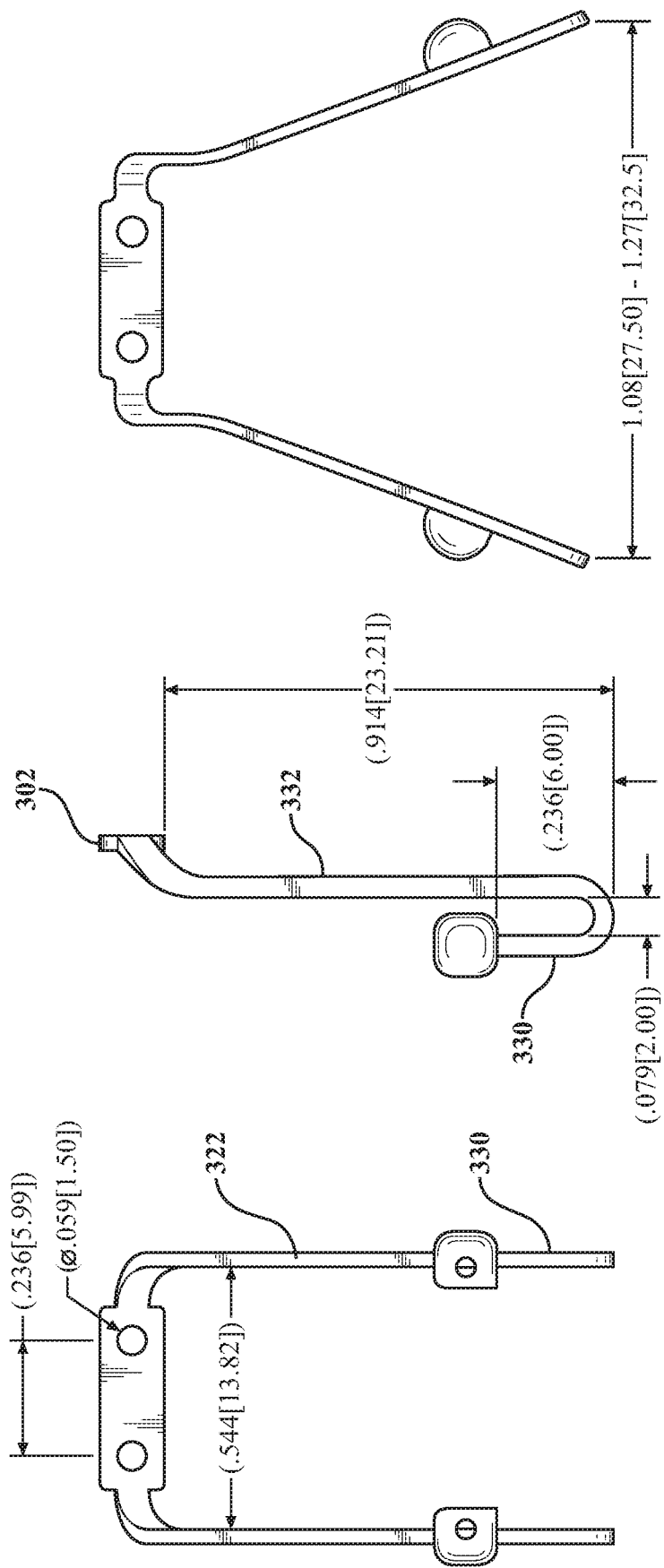

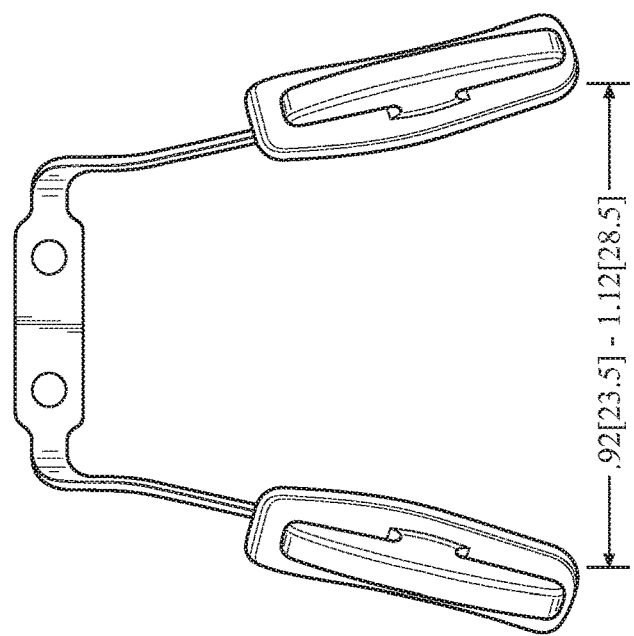
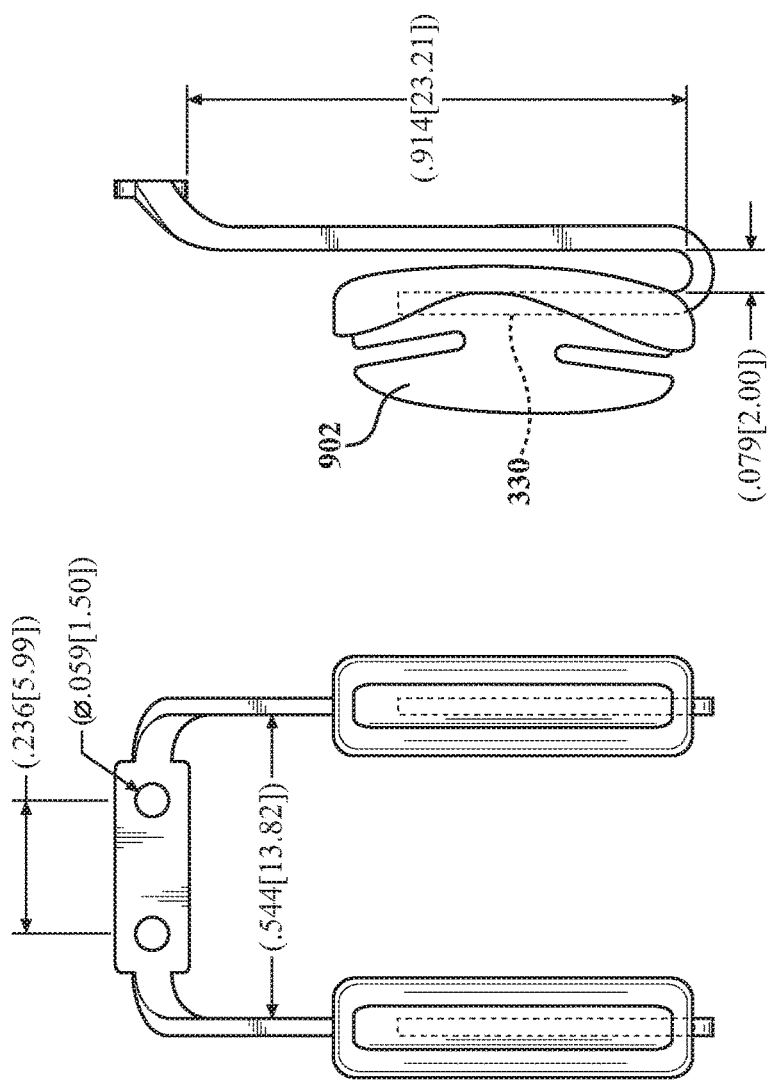
FIG. 8
FIG. 9
FIG. 10

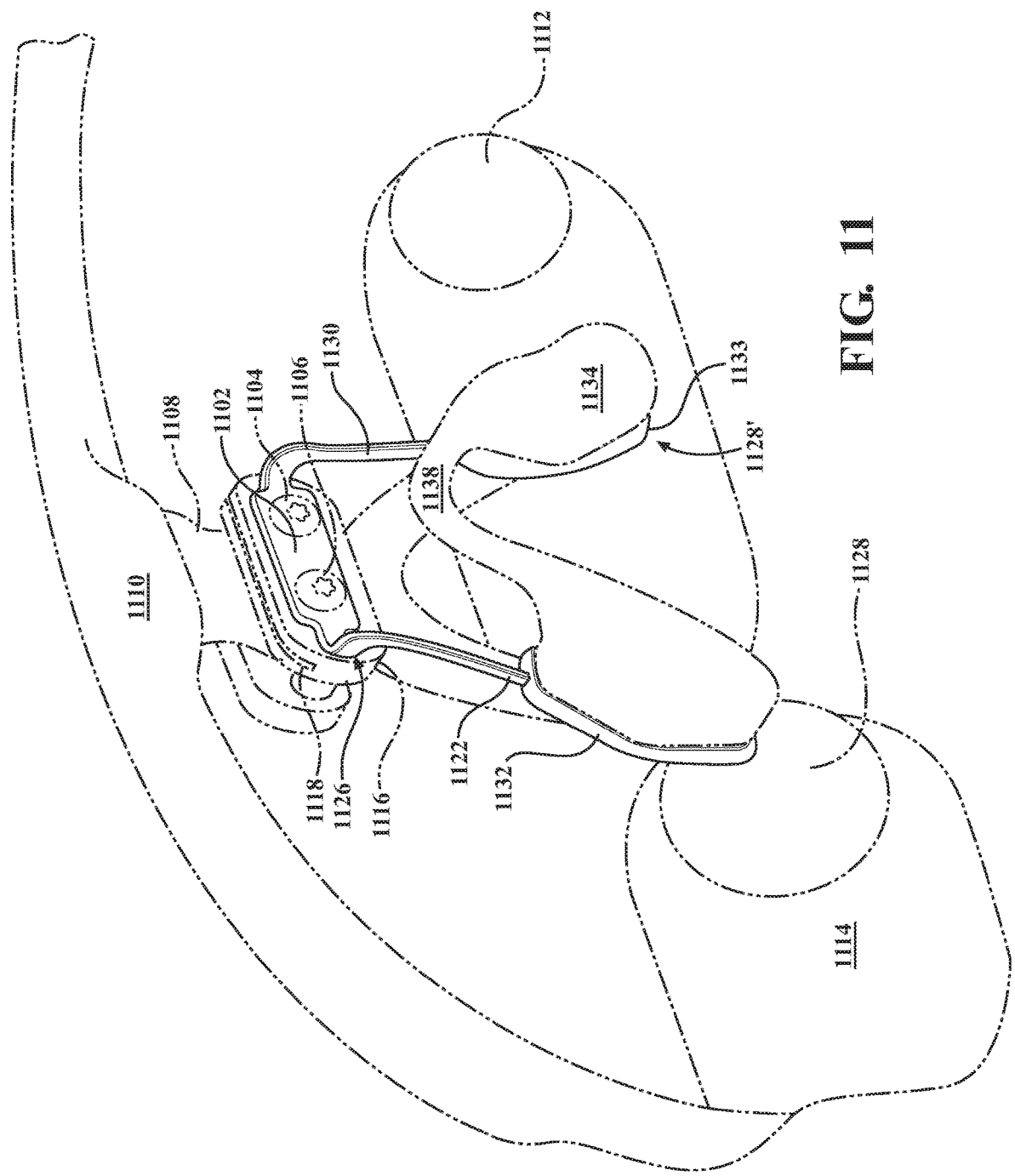

REMOVABLE, ADJUSTABLE WIRE ARMS FOR NOSE PADS

FIELD OF THE INVENTION

This invention relates generally to spectacle frames and, more particularly, to removable wire arms for spectacle frame nose pads.

BACKGROUND OF THE INVENTION

There are basically two types of loupe assemblies for surgical, medical and dental professionals: (1) the flip-up type, which provides for multiple degrees of adjustment freedom, and (2) the through-the-lens (TTL) types, wherein loupes for each eye are cemented into the eyeglass lenses. With flip-up styles, adjustments such as interpupillary distance and declination angle are readily provided through mechanical fasteners. With TTL loupes, however, adjustments of interpupillary distance and declination angle require more careful consideration.

Another aspect of TTL loupe design involves the distance between the oculars and the wearer's eyes. FIG. 1 illustrates a generic TTL configuration seen from the side, including eyeglass lens 102 and TTL ocular 104. The ocular 104 is cemented in the lens 102 in the region of 106, resulting in a distance "d" between the ocular device 104 and the eye of the wearer.

FIG. 2 is a drawing that shows a full set of eyeglass frames with non-adjustable nose pads. Particularly with advances in improved declination angle to improve posture, this distance "d" in FIG. 1 may be too small for certain facial features, resulting in interference with the person's eyelashes and/or a reduction in peripheral vision. In particular, the eyelashes of the wearer may touch the oculars, peripheral vision may be blocked by the ocular, and/or fogging of carrier lenses may occur due to limited ventilation.

My co-pending U.S. patent application Ser. No. 15/438, 167, the entire content of which is incorporated herein by reference, alleviates problems associated with prior-art devices by providing an adjustable nosepiece assembly for a set of eyeglass frames having a bridge portion between lenses. The assembly comprises a nosepiece component configured for coupling to the bridge portion of the eyeglass frames, the nosepiece component being adapted for resting on a wearer's nose when wearing the eyeglass frames, and a plurality of spacer components configured for placement between the nosepiece component and the bridge portion of the eyeglass frames to adjust the distance between the nosepiece component and the bridge portion of the eyeglass frames. The nosepiece component may assume an inverted-V shape with two angled leg portions extending downwardly and away from an upper portion coupled to the bridge portion of the eyeglass frames through one or more of the spacer components. The two angled leg portions may be formed with a flexible, pliable and/or soft material over a bendable wire frame or scaffold enabling the leg portions to be bent so as to adjust the distance between the TTL loupes and facial features of a wearer such as the cheeks, eyelashes, and so forth.

However, one limitation of the system just described is that the nose pads are integral to the inverted-V shape, such that different styles of removable nose pads are not easily accommodated. The need remains, therefore, for a more versatile system and method of removable and adjustable nose pads for eyeglass frames, particularly when fitted with TTL loupes.

SUMMARY OF THE INVENTION

This invention improves upon existing nose pad configurations by providing an assembly with removable and replaceable wire arms that attach to different nose pad configurations for enhanced versatility. The nose pad assemblies disclosed herein are configured for use with for a set of eyeglass frames having a bridge portion between right and left lenses. The preferred embodiment includes a plate having front and back surfaces, opposing side edges, and a plurality of through-holes adapted receive fasteners for mounting the plate on the bridge portion of the eyeglass frames. Opposing right and left wire members extend downwardly from a respective one of the side edges of the plate, and wherein each wire member terminates in a coupling mechanism adapted to receive a nose pad. In all embodiments, the wire members are manually bendable, enabling a user to independently adjust the distance between the nose pads and the distance of the nose pads from the eyeglass frames.

The wire members may extend outwardly from the opposing side edges of the plate before extending downwardly, and/or, the wire members may bend away from the bridge portion of the eyeglass frames before extending downwardly. In certain configurations, the wire members may extend downwardly then extend upwardly before terminating in the coupling mechanisms. The coupling mechanisms may include holes to receive nose pads with posts, and screws to hold the posts in position. Alternatively, the coupling mechanisms include barbed fins to receive nose pads with slots that engage with the barbed fins. In all embodiments, the coupling mechanisms are adapted to receive physically separate nose pads or a nose pads interconnected with an upper portion adapted to rest on the central ridge of a wearer's nose.

The fasteners for mounting the plate on the bridge portion of the eyeglass frames may be threaded fasteners that extend through the bridge portion. The wire members have circular, oval, square or rectangular cross sections. In the preferred embodiment, the plate and the wire members are integrally formed from the same piece of metal, by way of a stainless steel stamping process, for example.

One or more spacer components may be configured for placement between the plate and the bridge portion of the eyeglass frames to adjust the distance between the plate and the bridge portion of the eyeglass frames to facilitate adjustment of the distance between the plate and the bridge portion of the eyeglass frames, preferably in a range of 1 mm to 2 cm. A spacer component may include an upper side-to-side recess or groove to receive a bar connecting drop-in optical component such as prescription lenses or filters to be positioned between the lenses of the eyeglass frames and the eyes of a wearer. The lenses of the eyeglass frames may include through-the-lens (TTL) oculars or loupes.

BRIEF DESCRIPTION OF THE DRAWINGS

FIG. 4 is a view of the screw-on type adjustable wire assembly as would be seen from the back of the eyeglass lenses;

FIG. 5 is a side view of the screw-on type adjustable wire assembly;

FIG. 6 is a drawing that shows how the side arms of the screw-on type adjustable wire assembly may be bent outwardly to form an invented V-shape;

FIG. 8 is a view of the adjustable clip-on type adjustable wire assembly as would be seen from the back of the eyeglass lenses;

FIG. 9 is a side view of the adjustable clip-on type adjustable wire assembly;

FIG. 10 is a drawing that shows how the side arms of the adjustable clip-on type adjustable wire assembly may be bent outwardly to form an invented V-shape;

FIG. 11 is a perspective drawing that illustrates an alternative clip-on type removable wire assembly according to the invention;

FIG. 18B shows another way in which the front and rear blocks may be arranged to provide a wider drop-in gap for optical components such as lenses, filters, and the like.

DETAILED DESCRIPTION OF THE PREFERRED EMBODIMENTS

This invention improves upon the prior art by providing removable wire arms for spectacle frame nose pads. The invention encompasses three embodiments, including a screw-on type and two clip-on styles, all of which will be described in detail.

Figure 3:
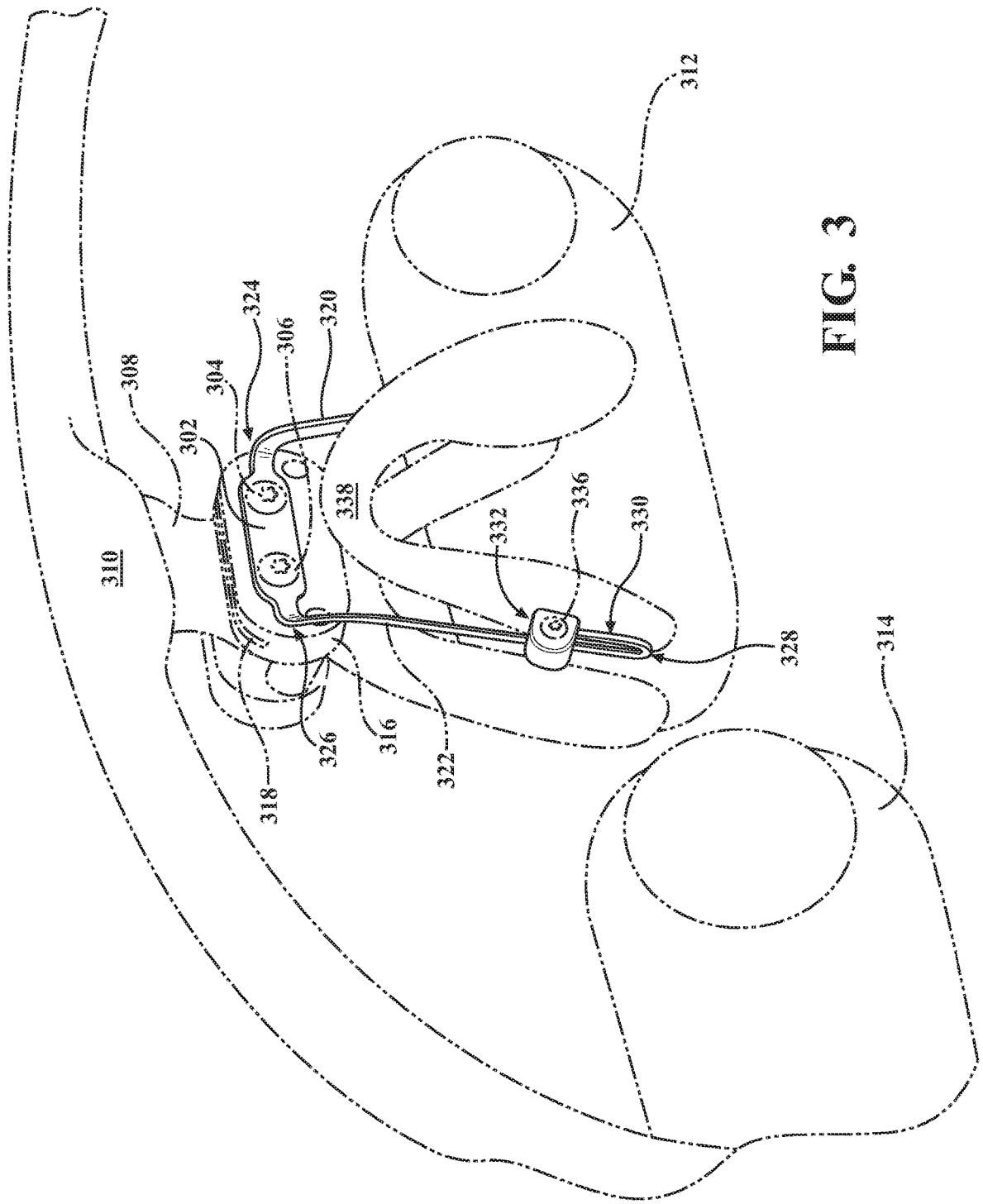
FIG. 3 is a perspective drawing that illustrates a screw-on type adjustable wire assembly according to the invention.

FIG. 3 is a perspective drawing that illustrates a screw-on type adjustable wire assembly according to the invention. The invention broadly includes a front plate 302 including spaced-apart holes to accommodate a pair of threaded fasteners 304, 306 to facilitate attachment to the bridge portion 308 of eyeglass frames 310. The eyeglass frames 310 include right and left lenses that carry through-the-lens loupes 312, 314, respectively.

Plate 302 may connect directly to bridge portion 308 or, for additional versatility, one or more spacer components 316 may be used to adjust the distance between the surface of the bridge portion with respect to a user's eyes or other facial features. As is the case with all embodiments described herein, spacer component 316 may include an upper right-left slot 318 for receiving drop-in filters interconnected with a bar attached to the lenses. In this embodiment, the groove or recess 318 is wide enough to receive the interconnecting bar, such that the filters are disposed between the user's eyes and the loupes 312, 314.

Figure 1:
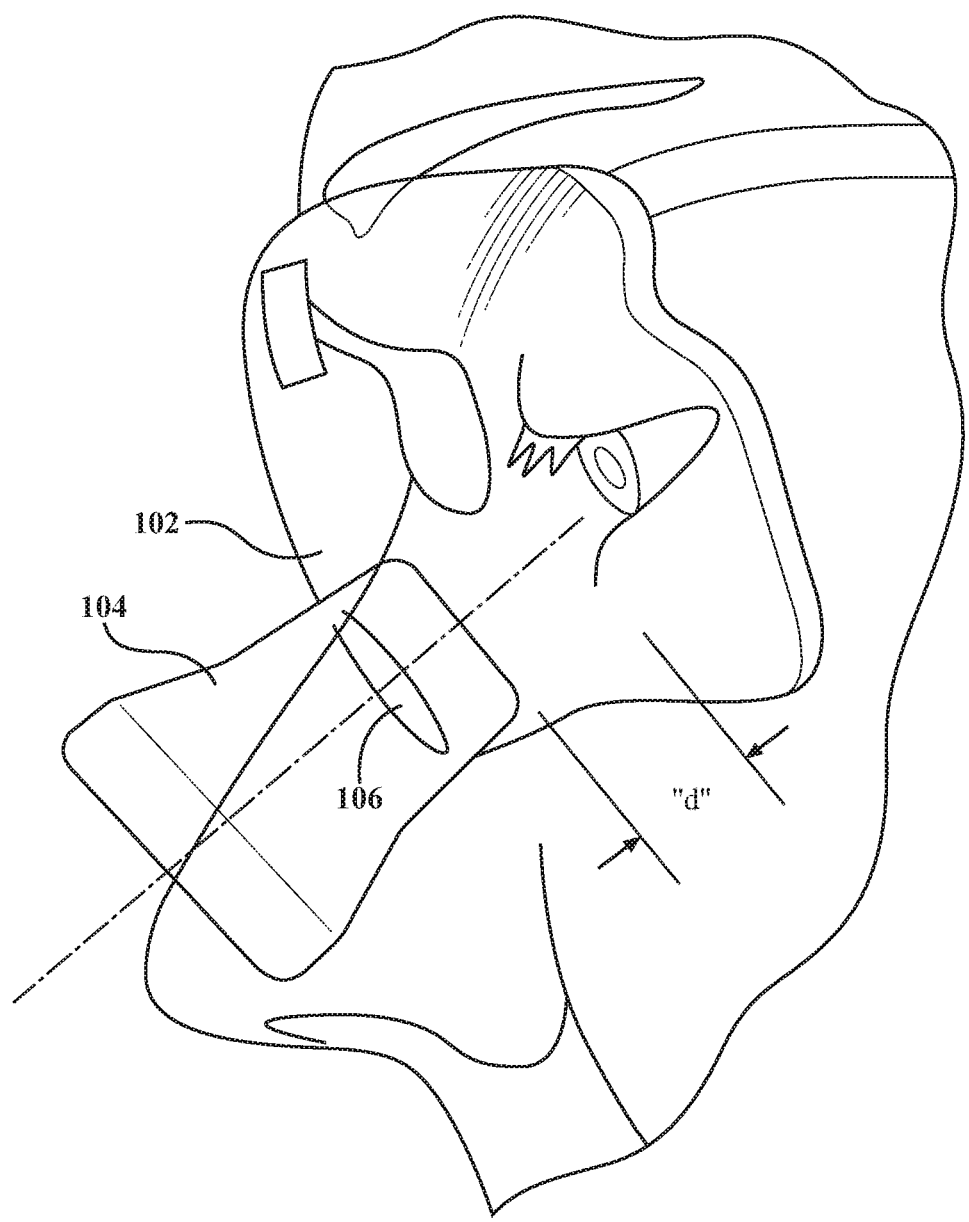
FIG. 1 is a drawing that shows how prior-art loupes or oculars often need adjustment for comfort and/or use.
Figure 2:
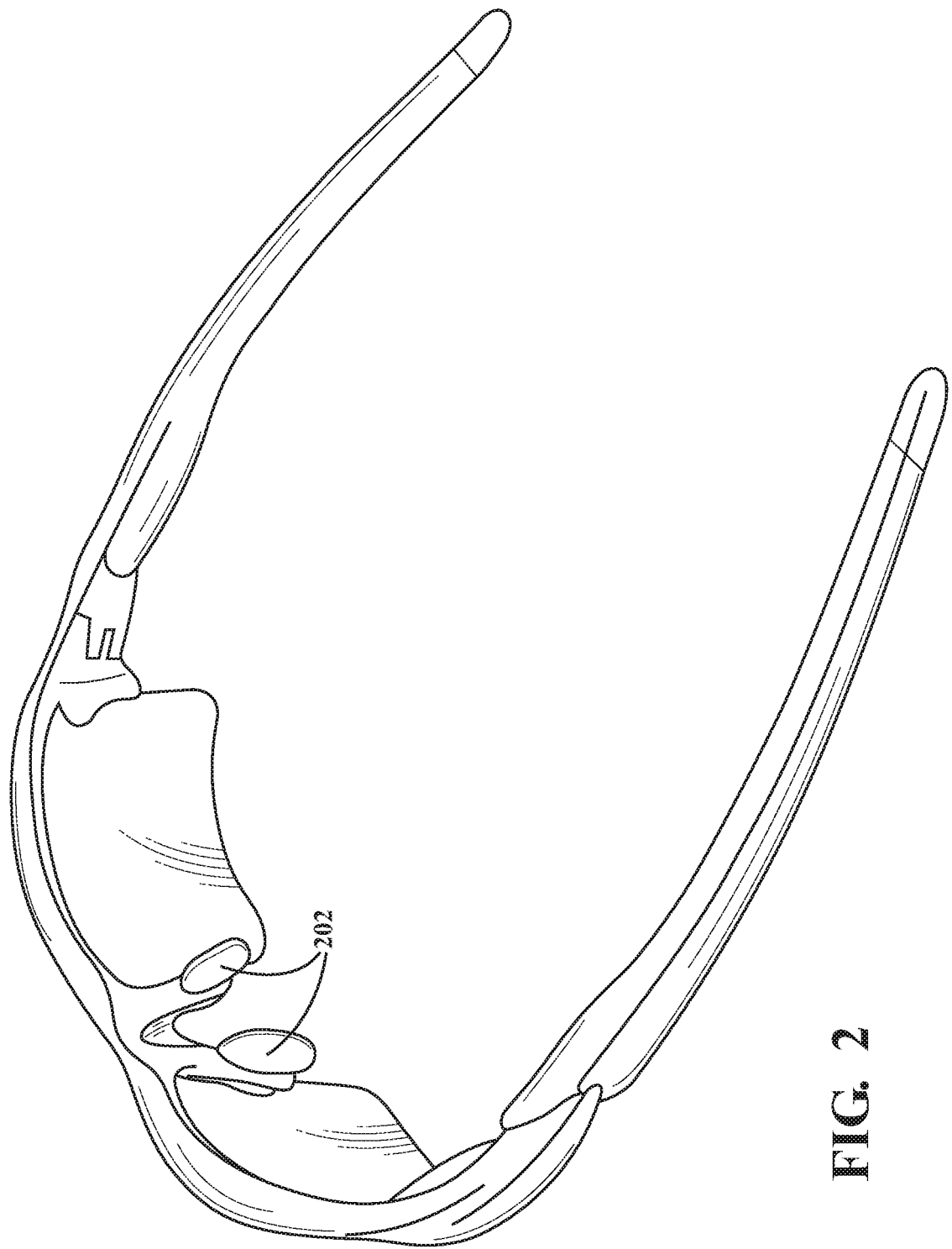
FIG. 2 is a drawing that shows prior-art eyeglass frames with non-adjustable nose pads.

Integrally formed with plate 302 are side wire arms 320, 322. These arms may be bent slightly forwardly at 324, 326, then extend downwardly to bottom bent portions, only one of which is visible at 328. After the lower bends, the arm extend back upwardly at 330, terminating in a screw coupling 332 on each side. The screw couplings include facing holes (not visible) to receive the post of removable nose pads 334. When the posts are received in the side holes of the couplers 332, the screws 336 are tightened to keep the removable nose pads in position. Note that while FIG. 3 shows a single, bend nose pad having an upper portion 338 that bridges the right and left nose pad portions, the system may also accommodate separate nose pads without the bridge portion as shown, for example, in FIG. 2.

FIG. 4 is a view of the screw-on type adjustable wire assembly as would be seen from the back of the eyeglass lenses, and FIG. 5 is a side view. The wires are preferably made from a semi-rigid yet bendable metal such as stainless steel that will allow for customization while retaining a shape following desired bending. Whiles the wires are shown as having a rectangular cross section, other cross-sectional geometries including round may alternatively be used. The dimensions shown are preferred with the understanding that variations are possible depending upon design. FIG. 6 shows how the side arms may be bent outwardly to form an invented V-shape.

FIGS. 7-10 illustrate an adjustable clip-on type removable wire assembly according to the invention. As with the other embodiments disclosed herein, the assembly includes a front plate 702 including spaced-apart holes to accommodate a pair of threaded fasteners 704, 706 to facilitate attachment to the bridge portion 708 of eyeglass frames 710. The eyeglass frames 710 include right and left lenses that carry through-the-lens loupes 712, 714, respectively.

Plate 702 may connect directly to bridge portion 708 or, for additional versatility, one or more spacer components 716 may be used to adjust the distance between the surface of the bridge portion with respect to a user's eyes or other facial features. As is the case with all embodiments described herein, spacer component 716 may include an upper right-left slot 718 for receiving drop-in filters interconnected with a bar attached to the lenses. In this embodiment, the groove or recess 718 is wide enough to receive the interconnecting bar, such that the filters are disposed between the user's eyes and the loupes 712, 714.

Figure 7:
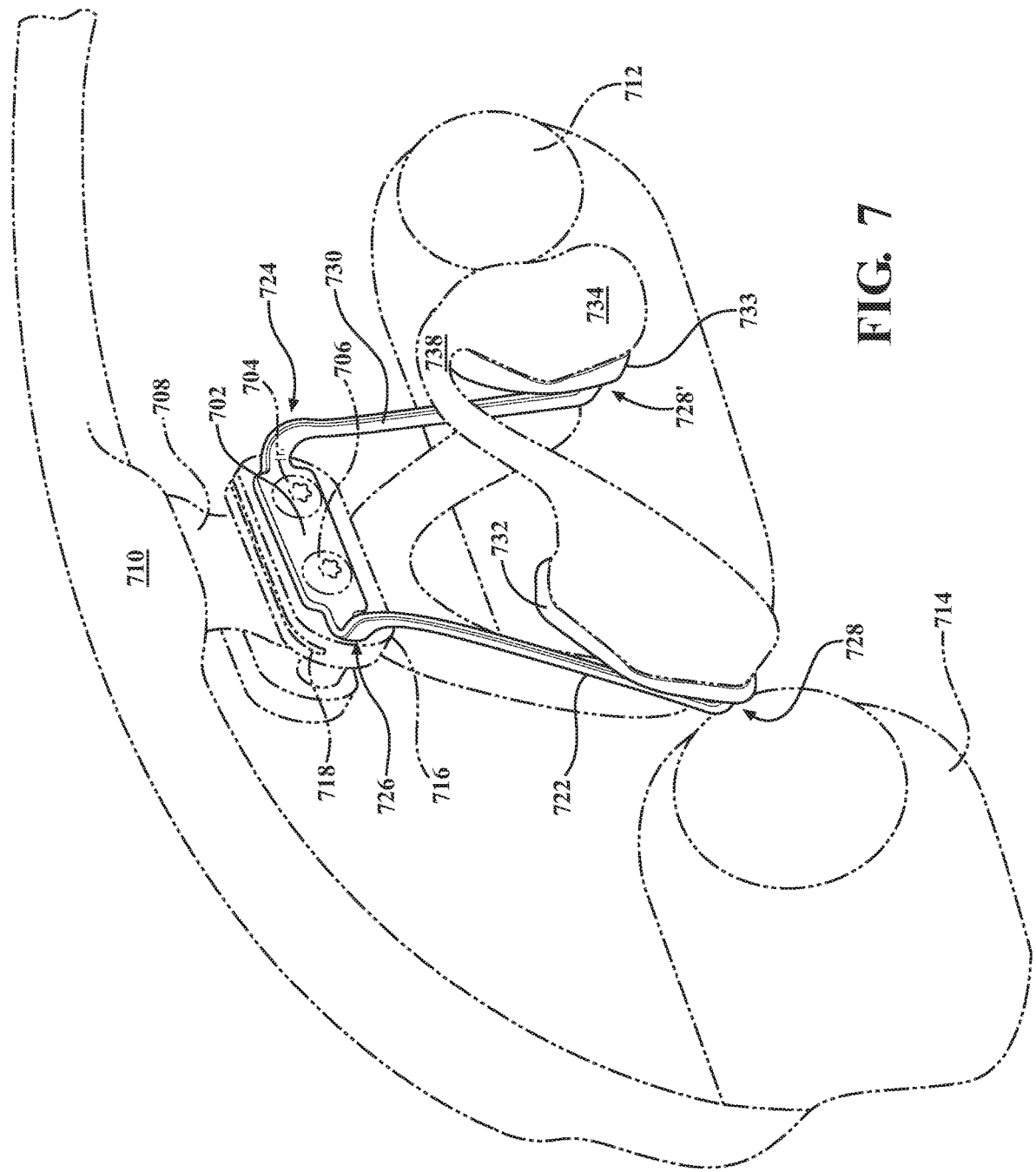
FIG. 7 is a perspective drawing that illustrates an adjustable clip-on type removable wire assembly according to the invention.

Integrally formed with plate 702 are side wire arms 720, 722. These arms may be bent slightly forwardly at 724, 726, then extend downwardly to bottom bent portions 328, 328'. After the lower bends, the arms extend back upwardly at 330 (FIG. 9), terminating in a pads 732, 733 on each side. Each pad includes barbed coupling fins such as 902 illustrated in FIG. 9. Each of these barbed fins is physically configured to receive a nose pad or nose pad portion including slot adapted to engage with these barbed fins to hold the nose pad(s) in place. Note that while FIG. 7 shows a single, bend nose pad having an upper portion 738 that bridges the right and left nose pad portions, the system may also accommodate separate nose pads without the bridge portion as shown, for example, in FIG. 2.

FIG. 8 is a view of the adjustable wire clip-on embodiment as would be seen from the back of the eyeglass lenses, and FIG. 9 is a side view. The wires are preferably made from a semi-rigid yet bendable metal such as stainless steel that will allow for customization while retaining a shape following desired bending. Whiles the wires are shown as having a rectangular cross section, other cross-sectional geometries including round may alternatively be used. The dimensions shown are preferred with the understanding that variations are possible depending upon design. FIG. 10 shows how the side arms may be bent outwardly to form an invented V-shape. As with FIG. 6, the spread dimension is typical as opposed to required.

FIGS. 11-14 illustrate a straight-arm, clip-on type removable wire assembly according to the invention. As with the other embodiments disclosed herein, the assembly includes a front plate 1102 including spaced-apart holes to accommodate a pair of threaded fasteners 1104, 1106 to facilitate attachment to the bridge portion 1108 of eyeglass frames 1110. The eyeglass frames 1110 include right and left lenses that carry through-the-lens loupes 1112, 1114, respectively.

Plate 1102 may connect directly to bridge portion 1108 or, for additional versatility, one or more spacer components 1116 may be used to adjust the distance between the surface of the bridge portion with respect to a user's eyes or other facial features. As is the case with all embodiments described herein, spacer component 1116 may include an upper right-left slot 1118 for receiving drop-in filters interconnected with a bar attached to the lenses. In this embodiment, the groove or recess 1118 is wide enough to receive the interconnecting bar, such that the filters are disposed between the user's eyes and the loupes 1112, 1114.

Integrally formed with plate 1102 are side wire arms 1120, 1122. These arms may be bent slightly forwardly at 1124, 1126, then extend downwardly to pads 1132, 1133 on each side. Each pad includes barbed coupling fins such as 1102 illustrated in FIG. 13. Each of these barbed fins is physically configured to receive a nose pad or nose pad portion including slot adapted to engage with these barbed fins to hold the nose pad(s) in place. Note that while FIG. 11 shows a single, bend nose pad having an upper portion 1138 that bridges the right and left nose pad portions, the system may also accommodate separate nose pads without the bridge portion as shown, for example, in FIG. 2.

Figure 14:
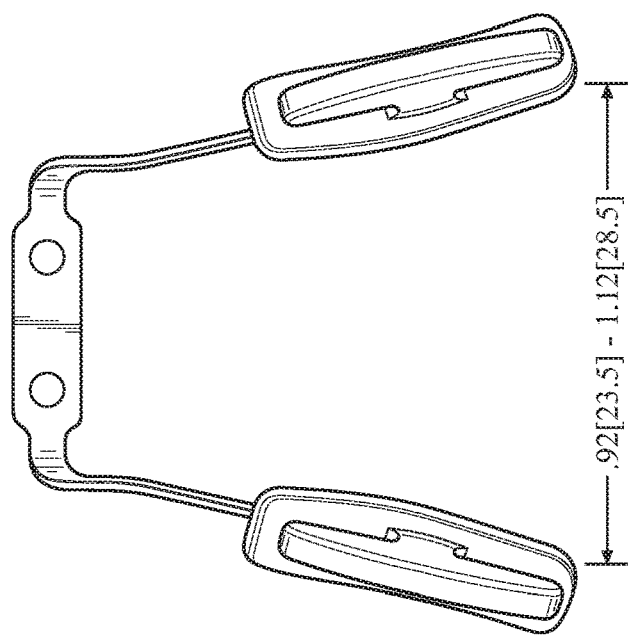
FIG. 14 is a drawing that shows how the side arms of the adjustable clip-on type adjustable wire assembly may be bent outwardly to form an invented V-shape.
Figure 13:
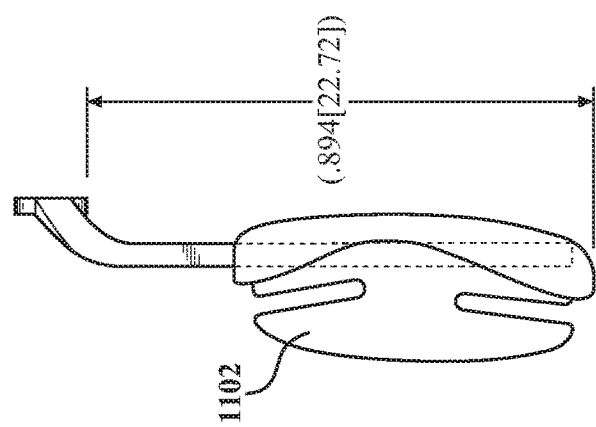
FIG. 13 is a side view of the alternative clip-on type assembly.
Figure 12:
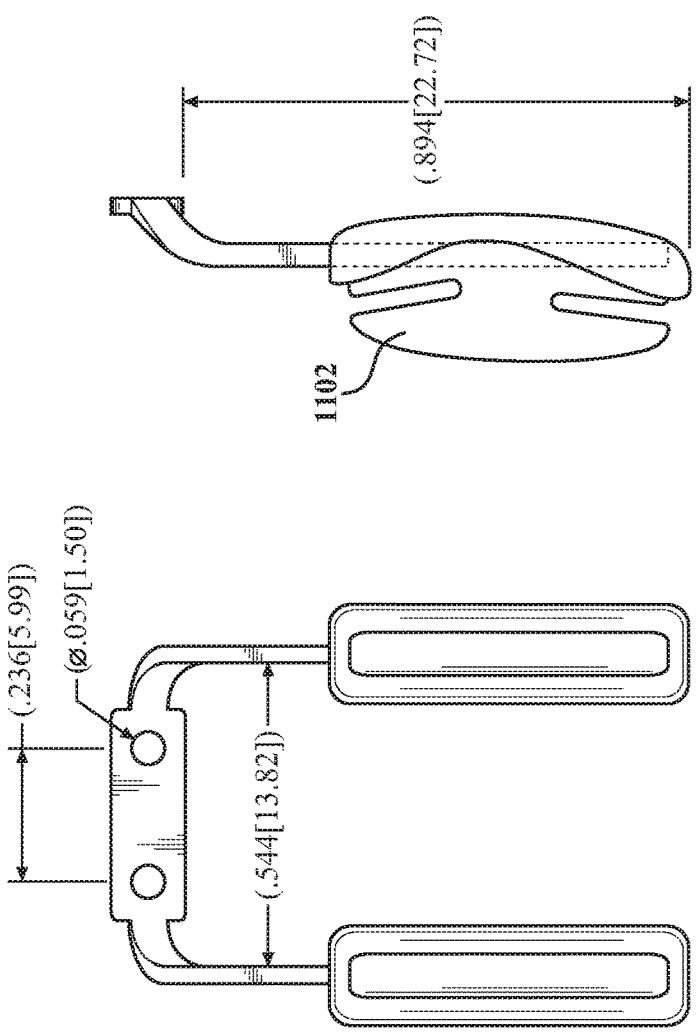
FIG. 12 is a view of the alternative clip-on type assembly as would be seen from the back of the eyeglass lenses.

FIG. 12 is a view of straight-arm wire clip-on embodiment as would be seen from the back of the eyeglass lenses, and FIG. 13c is a side view. The wires are preferably made from a semi-rigid yet bendable metal such as stainless steel that will allow for customization while retaining a shape following desired bending. While the wires are shown as having a rectangular cross section, other cross-sectional geometries including round may alternatively be used. The dimensions shown are preferred with the understanding that variations are possible depending upon design. FIG. 14 shows how the side arms may be bent outwardly to form an invented V-shape. As with FIGS. 6, 10, the spread dimension is typical as opposed to required.

Figure 15:
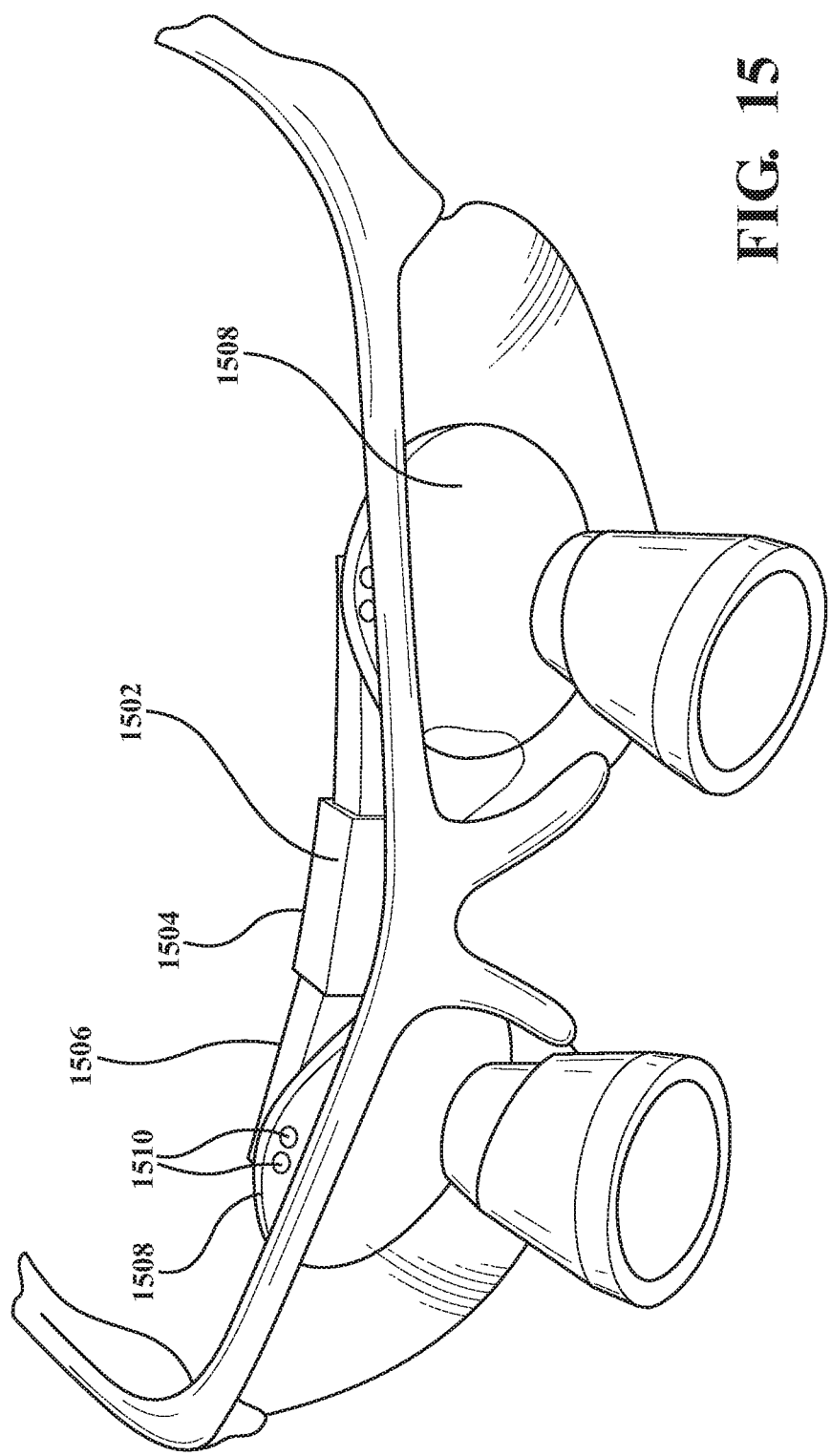
FIG. 15 shows how spacer blocks may be provided with recesses or grooves to receive optical components and filters between the eyeglass lenses and a user's eyes.

FIG. 15 shows a spacer block structure 1202 with a recess 1204 for receiving drop-in filters 1208 interconnected with a bar 1206, which may be attached to the lenses 1208 with fasteners 1210. The groove or recess 1204 is wide enough to receive the interconnecting bar 1206. The lenses 1208 may be of any type, including prescription lenses, color, x-ray or other filters.

Figure 16:
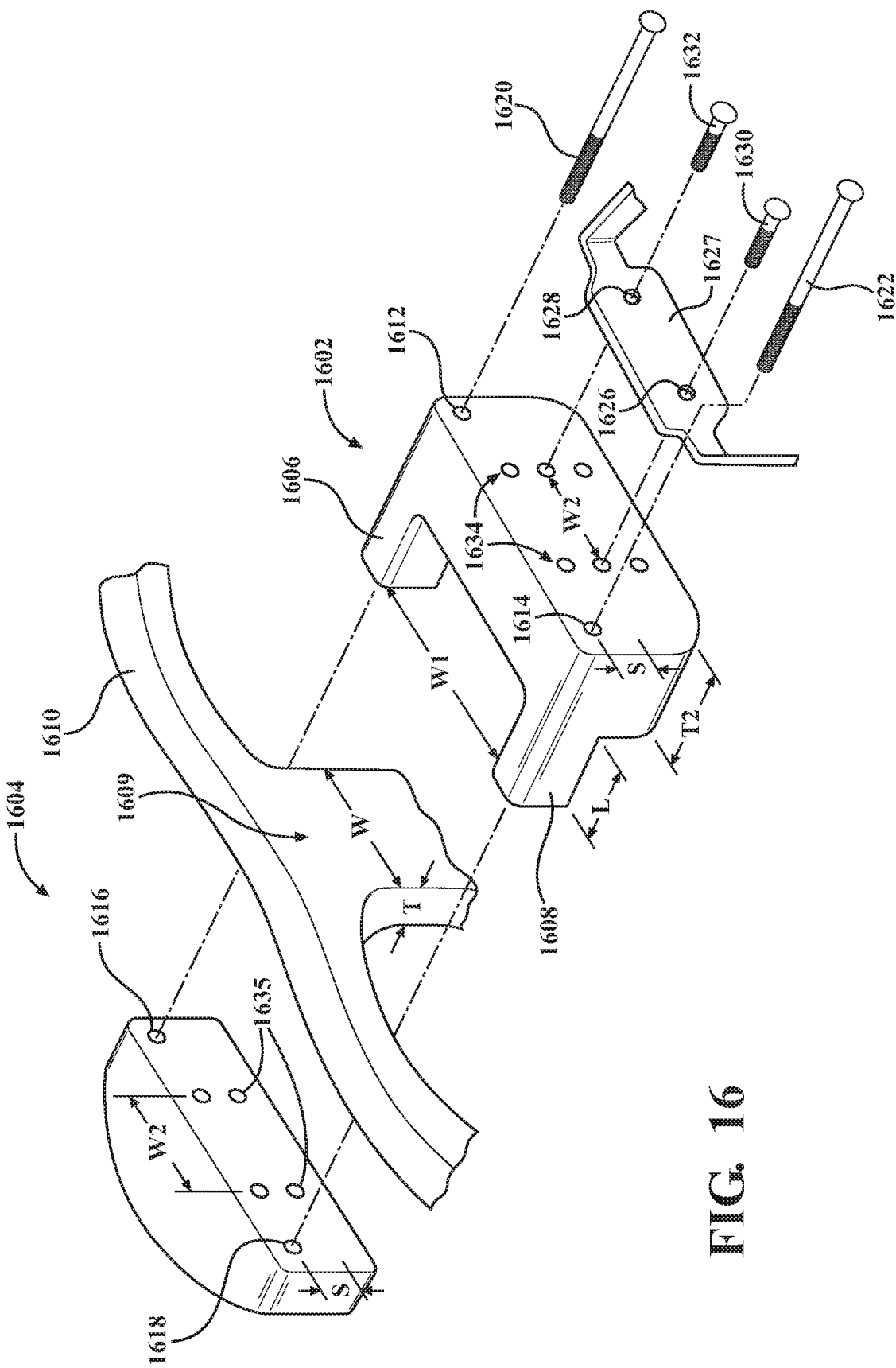
FIG. 16 is an exploded view showing a versatile mounting system made possible with front and rear mounting blocks with different hole configurations.

FIG. 16 is a drawing that shows an alternative, versatile coupling system that includes a rear mounting block 1602 that connects to a front mounting block 1604. Both blocks are preferably constructed from hard plastic. Fasteners 1620, 1624 extend through holes 1612, 1614 in the rear block 1602 and into corresponding holes 1616, 1618 on the front mounting block. The fasteners 1620, 1624, as well and the holes that receive them, may be threaded.

Rear mounting block 1602 includes right and left forwardly oriented extensions 1606, 1608, each with a length L corresponding to the thickness T of the bridge portion 1609 of eyeglass frames 1610. In the preferred embodiment, L is slightly less than T so that the front and rear blocks maintain a snug, frictional fit while mounted on the bridge portion. The extension arms 1606, 1608 are also spaced apart by a distance W1 that is wider than the width W of the bridge portion 1609. Note that while arms 1606, 1608 extend forwardly from the rear block, it is also possible that opposing arms extend from front block 1604 so long as the combined length L is maintained. Note further that different rear blocks 1602 may be provided with varying, incremental thicknesses T2 in the range of 1 mm to 1 cm.

Any suitable nose pads may be coupled to the rear block 1602, including any of the wire arm units described herein. Such a wire-arm assembly is shown in the drawing, which includes mounting plate 1627 and mounting holes 1626, 1628. Fasteners 1622, 1632 are received through mounting holes 1626, 1628 and into corresponding holes 1634 in rear mounting block 1602. In the preferred embodiments, holes 1634 are spaced apart by a width W2 that is at least slightly greater than the width W of bridge portion 1609. As such, fasteners 1630, 1632 may extend all the way into corresponding holes 1635 in front mounting block 1604. Alternatively, fasteners 1630, 1632 may only enter into block 1602, as the blocks 1602, 1604 are held in position with fasteners 1620, 1622. The fasteners 1630, 1632, as well and the holes that receive them, may be threaded.

While a single set of holes 1634 may be present in rear block 1602 (and front block 1604), in the preferred embodiment, two or more vertically stacked sets of holes are provided for added versatility. In the preferred embodiment, rear block included three sets of vertically stacked holes, with the spacing S of each set being in the range of 1-3 mm, more preferably 2 mm. Front block 1604 preferably includes at least two vertical stacks of holes, as shown, with a spacing S that corresponds to the spacing between the rows of holes in the forward block 1602.

Figure 17A:
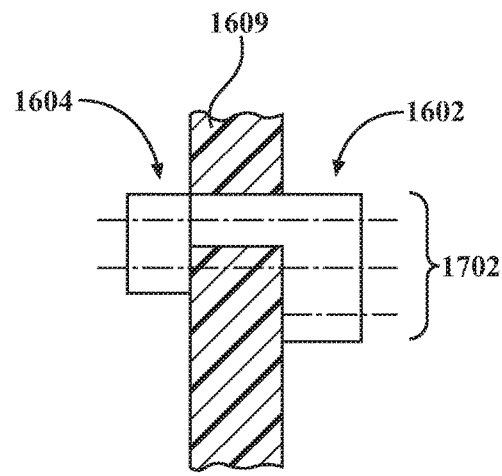
FIG. 17A shows one possible mounting, wherein a front block is arranged to provide three sets of notepad mounting holes.
Figure 17B:
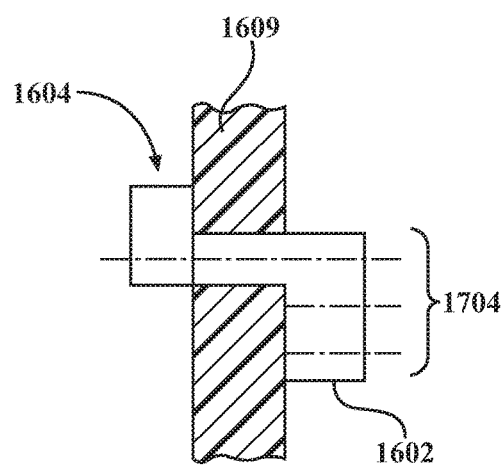
FIG. 17B is a drawing that shows, by flipping front block of FIG. 17A, the three sets of holes are shifted downwardly by the spacing S, such that the overall range of possible vertical notepad mounting is 4S.

FIGS. 17, 18 illustrate the added versatility made possible by having front and rear mounting blocks with vertically stacked sets of holes. FIG. 17A shows one possible mounting, wherein front block 1604 is oriented as depicted in FIG. 16. This provides three sets of notepad mounting holes, 1702, each set being spaced apart by S. However, by flipping front block 1604 as shown in FIG. 17B, the three sets of holes are shifted downwardly by the spacing S, such that the overall range of possible vertical shift is 4 S. If S is 2 mm, this allows for 8 mm of vertical mounting. This in conjunction with flexible or malleable wire arms facilitates a very wide range of notepad configurations for increased comfort.

Figure 18A:
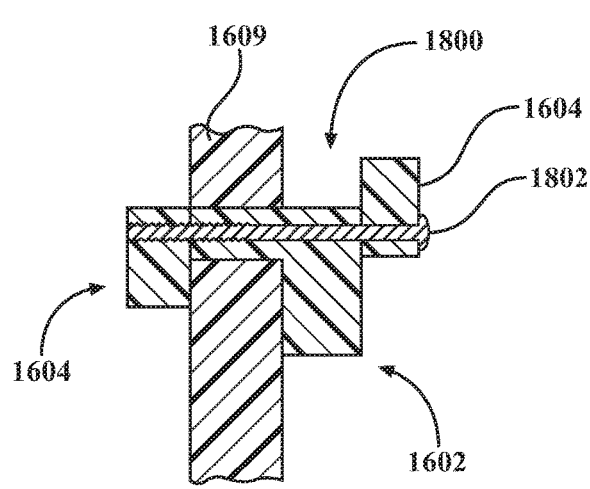
FIG. 18A shows one way in which the front and rear blocks may be arranged to provide a drop-in gap for optical components such as lenses, filters, and so forth.
Figure 18B:
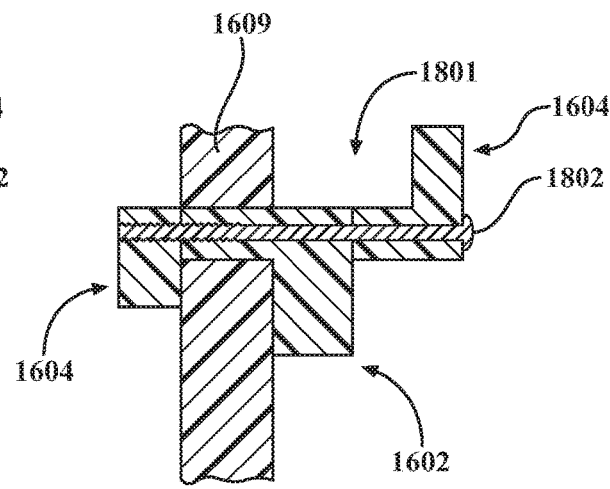

FIG. 18 shows how the blocks may be configured with longer fasteners to provide drop-in gaps 1800, 1801 with varying spacings to accommodate various lenses and filters, including thicker devices. For example, in FIG. 18A, an additional front block 1604 has been mounted against the rear surface of rear block, providing a gap 1800 for drop-in lenses, filters, etc. As shown in FIG. 18B, an additional rear block 1602 may also be used to provide an even wider gap

1801. Note that the versatility is not limited by FIG. 17, 18, and that any possible configuration made possible by the various holes may be used to provide different configurations depending only upon fastener length.

The invention claimed is:

1. An adjustable nose pad assembly for a set of eyeglass frames having a bridge portion between right and left lenses, comprising:
   a plate having front and back surfaces and opposing side edges;
   wherein the plate is adapted for mounting on the bridge portion of the eyeglass frames;
   opposing right and left wire members, each wire member extending downwardly from a respective one of the side edges of the plate, and wherein each wire member terminates in a coupling mechanism adapted to receive a respective nose pad;
   wherein the right and left wire members are manually bendable, enabling a user to independently adjust the distance between the nose pads and the distance of the nose pads from the eyeglass frames; and
   further including one or more spacer components configured for placement between the plate and the bridge portion of the eyeglass frames to adjust the distance between the plate and the bridge portion of the eyeglass frames.

2. The adjustable nose pad assembly of claim 1, wherein the spacer components facilitate adjustment of the distance between the plate and the bridge portion of the eyeglass frames in a range of 1 mm to 1 cm.

3. The adjustable nose pad assembly of claim 1, including a spacer component having an upper side-to-side recess or groove to receive a bar connecting drop-in optical component to be positioned between the lenses of the eyeglass frames and the eyes of a wearer.

4. The assembly of claim 3, wherein the drop-in optical component comprises prescription lenses or filters.

5. The adjustable nose pad assembly of claim 1, wherein the spacer component includes a plurality of vertically stacked, spaced-apart rows of mounting holes to facilitate adjustable, vertical displacement of nose pad mounting.

6. The adjustable nose pad assembly of claim 5, wherein the vertically stacked rows of mounting holes are spaced apart by a distance of 1-3 mm.

7. The adjustable nose pad assembly of claim 5, wherein the spacer component is a rear mounting block that attaches to a front mounting block.

8. The adjustable nose pad assembly of claim 7, wherein the front mounting block turns upside down to facilitate adjustable, vertical displacement of nose pad mounting.

9. The adjustable nose pad assembly of claim 7, wherein:
   the rear mounting block has a rear surface; and
   one of the front mounting blocks or another one of the rear mounting blocks mounts against the rear surface to provide a side-to-side gap for receiving a drop-in optical component.

* * * * *